United States Patent
Divakara

(10) Patent No.: US 12,236,061 B2
(45) Date of Patent: *Feb. 25, 2025

(54) METHOD AND SYSTEM FOR VISUAL REPRESENTATION OF SENSOR-DETECTED EVENTS

(71) Applicant: Honeywell International Inc., Charlotte, NC (US)

(72) Inventor: Manjunatha Tumkur Divakara, Tumkur (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/443,006

(22) Filed: Feb. 15, 2024

(65) Prior Publication Data

US 2024/0184419 A1 Jun. 6, 2024

Related U.S. Application Data

(63) Continuation of application No. 17/694,205, filed on Mar. 14, 2022, now Pat. No. 11,934,633.

(51) Int. Cl.
| | | |
|---|---|---|
| *G06F 3/048* | (2013.01) | |
| *G06F 3/04817* | (2022.01) | |
| *G06F 3/04847* | (2022.01) | |

(52) U.S. Cl.
CPC ...... *G06F 3/04817* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 6,332,147 | B1 | 12/2001 | Moran et al. |
| 6,665,004 | B1 | 12/2003 | Paff |
| 6,873,256 | B2 | 3/2005 | Lemelson et al. |
| 9,398,283 | B2 | 7/2016 | Wu et al. |
| 9,412,245 | B2 * | 8/2016 | Gurudoss ............... H04N 7/181 |
| 9,972,181 | B1 * | 5/2018 | Baldwin .......... G08B 13/19691 |
| 10,241,640 | B2 | 3/2019 | Gurudoss et al. |
| 10,424,190 | B2 | 9/2019 | Zribi et al. |

(Continued)

OTHER PUBLICATIONS

Extended European Search Report, EP Application No. 23157983.0, European Patent Office, dated Aug. 14, 2023 (10 pages).

*Primary Examiner* — Thanh T Vu
(74) *Attorney, Agent, or Firm* — Seager, Tufte & Wickhem, LLP

(57) ABSTRACT

A method for monitoring a security system includes receiving a plurality of events produced by one or more of a plurality of components of the security system. A corresponding event type is identified for each of the plurality of received events from a plurality of event types. A spatial representation of at least part of the facility is displayed on a display of a user interface. For each of at least some of the plurality of received events, a predefined event icon that corresponds to the event type of the event is displayed on the spatial representation of at least part of the facility, at a location that corresponds to the location of the facility that the component that produced the event is located, and at a time that corresponds to the time that the event was produced by the corresponding component.

20 Claims, 11 Drawing Sheets

(56) References Cited

U.S. PATENT DOCUMENTS

| | | | |
|---|---|---|---|
| 11,074,460 B1* | 7/2021 | Hodges | G06V 20/52 |
| 11,494,729 B1* | 11/2022 | Guan | G06F 3/0481 |
| 2009/0199118 A1 | 8/2009 | Sabato et al. | |
| 2017/0185278 A1* | 6/2017 | Sundermeyer | H04L 12/2818 |
| 2018/0033279 A1* | 2/2018 | Chong | G06Q 10/0633 |
| 2023/0104880 A1* | 4/2023 | Pearson | G06F 3/04842 |
| | | | 715/835 |

* cited by examiner

METHOD AND SYSTEM FOR VISUAL REPRESENTATION OF SENSOR-DETECTED EVENTS

This is a continuation of co-pending U.S. patent application Ser. No. 17/694,205, filed Mar. 14, 2022, and entitled "METHOD AND SYSTEM FOR VISUAL REPRESENTATION OF SENSOR-DETECTED EVENTS", which is incorporated herein by reference.

TECHNICAL FIELD

The present disclosure pertains generally to monitoring a security system and more particularly to systems and methods for monitoring events detected by a security system.

BACKGROUND

A security system may include a large number of security sensors that are not video cameras and thus do not produce a video stream. Non-video security sensors include, for example, PIR motion detectors, glass break detectors, entry detectors and smoke detectors. Each of these sensors can detect and convey sensor events to a security system. Security systems can also detect events such as arming and disarming the security system, or a low battery event in one of the security sensors. While a tabular listing of such events, sometimes with corresponding time stamps, can convey event information to security personnel, such an approach does not provide an intuitive sense of what is happening, where particular events have occurred and in what sequence. A need remains for improved systems and methods for conveying event information of a security system to security personnel.

SUMMARY

The present disclosure pertains generally to monitoring a security system and more particularly to systems and methods for monitoring events detected by a security system. In one example, a monitoring station for a security system of a facility is disclosed. The illustrative monitoring station includes an input port for receiving events produced by each of a plurality of components of the security system of a facility, wherein each of the plurality of components is located in a corresponding geographic region of the facility. The monitoring station includes a user interface including a display as well as a memory that is configured to store a plurality of predefined event icons, wherein each of the plurality of predefined event icons corresponds to a different one of a plurality of event types, and each of the plurality of predefined event icons includes a graphical representation that is indicative of the corresponding event type. A controller is operably coupled with the input port, the user interface and the memory.

The controller is configured to receive via the input port a plurality of events produced by one or more of the plurality of components of the security system of the facility. Each of the plurality of events is produced at a corresponding time. The controller is configured to identify for each of the plurality of events received via the input port a corresponding event type from the plurality of event types. The controller is configured to display on the display of the user interface a spatial representation of at least part of the facility, and for each of at least some of the plurality of events received via the input port, the controller is configured to display on the spatial representation of at least part of the facility the predefined event icon that corresponds to the event type of the event, at a location that corresponds to the geographic region of the facility that the component that produced the event is located, and at a time that corresponds to the time that the event was produced by the corresponding component.

As another example, a method for monitoring a security system of a facility is disclosed. The illustrative method includes receiving a plurality of events produced by one or more of a plurality of components of the security system of the facility, each of the plurality of events produced by a corresponding component at a corresponding location in the facility and at a corresponding time. A corresponding event type is identified for each of the plurality of received events from a plurality of event types. A spatial representation of at least part of the facility is displayed on a display of a user interface. For each of at least some of the plurality of received events, a predefined event icon that corresponds to the event type of the event is displayed on the spatial representation of at least part of the facility, at a location that corresponds to the location of the facility that the component that produced the event is located, and at a time that corresponds to the time that the event was produced by the corresponding component.

As another example, a non-transient computer-readable storage medium has instructions stored thereon. When the instructions are executed by one or more processors, the one or more processors are caused to receive a plurality of events produced by one or more of a plurality of components of a security system of a facility. Each of the plurality of events produced by a corresponding component at a corresponding location in the facility and at a corresponding time. The one or more processors are further caused to identify for each of the plurality of received events a corresponding event type from a plurality of event types. The one or more processors are caused to display on a display of a user interface a spatial representation of at least part of the facility. For each of at least some of the plurality of received events, the one or more processors are caused to display on the spatial representation of at least part of the facility, a predefined event icon that corresponds to the event type of the event, at a location that corresponds to the location of the facility that the component that produced the event is located, and at a time that corresponds to the time that the event was produced by the corresponding component.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1A:
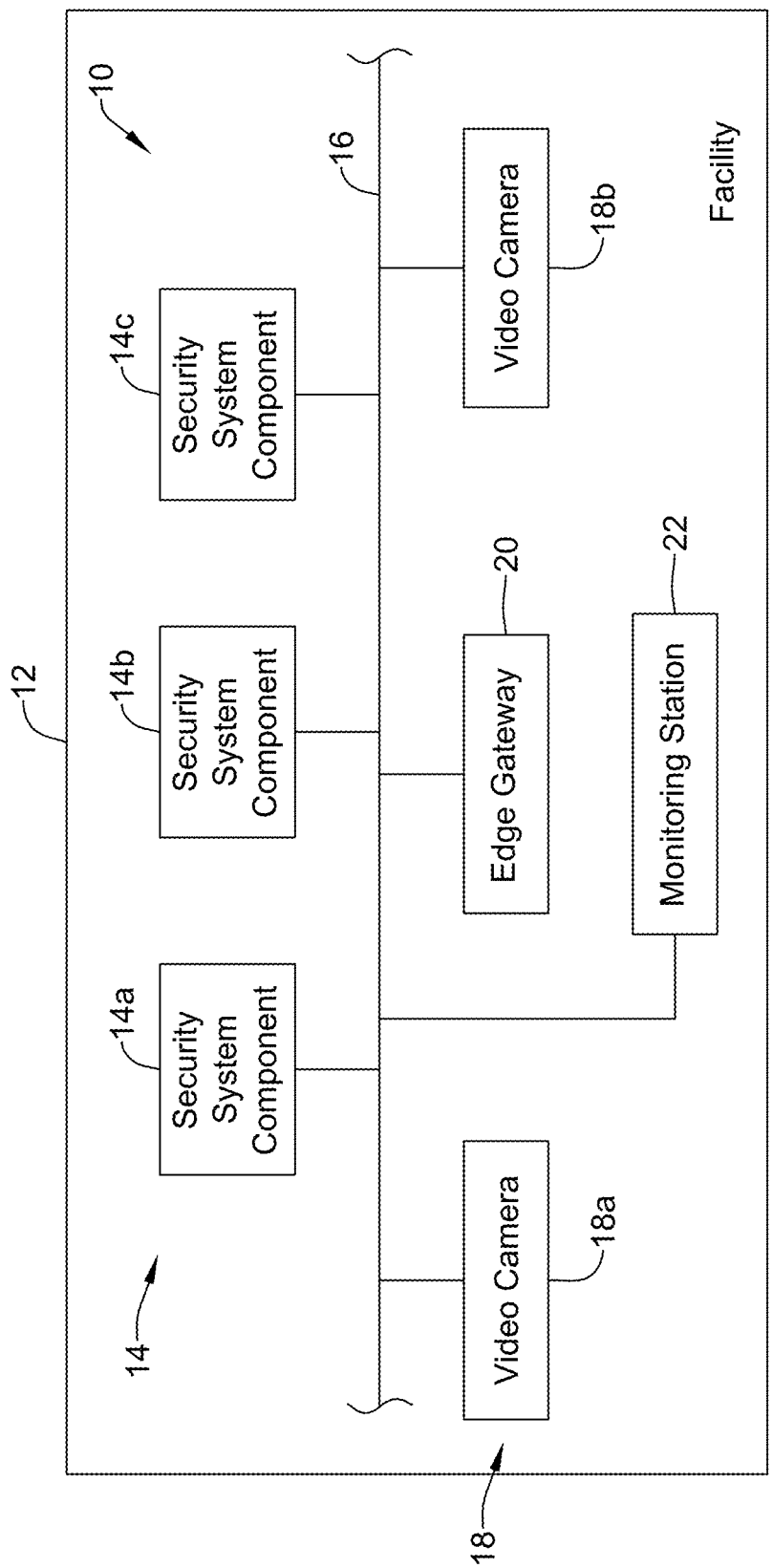
FIG. 1A is a schematic block diagram of an illustrative facility including a security system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1A is a schematic block diagram of an illustrative security system 10 that is disposed within a facility 12. The facility 12 may represent a building or part of a building, for example. The facility 12 may represent a campus that includes multiple buildings. The illustrative security system 10 includes a number of security system components 14, individually labeled as 14a, 14b and 14c. While a total of three security system components 14 are shown, it will be appreciated that this is merely illustrative, as the security system 10 may include any number of security system components 14, and in many cases may include hundreds or even thousands of security system components 14.

In some instances, the security system components 14 include one or more sensors, and at least some of the one or more sensors produce an event when a corresponding sensed condition is detected. The one or more sensors include, for example, one or more non-video-based sensors such as a glass break sensor, a motion sensor (e.g. PIR), a door contact sensor, and a window contact sensor. In some instances, the one or more sensors include video-based sensors, such as video cameras. In some cases, at least some of the one or more sensors produce sensor health events when a corresponding sensor health condition is detected, wherein the sensor health condition includes one or more of a sensor low battery condition, a sensor short circuit condition and a sensor open circuit condition. As another example, the security system components 14 may include one or security panels, wherein one or more of the security panels produce an event when a user arms at least part of the security system 10 via the one or more security panels, the user disarms at least part of the security system 10 via the one or more security panels and/or the user bypasses a security sensor of the security system 10 via the one or more security panels. These are just examples.

Each of the security system components 14 may be operably coupled with a security system network 16. The security system network 16 may include a wired (e.g. Ethernet) and/or wireless network within the facility 12, for example. In some cases, at least portions of the security system network 16 may operate via any of a variety of different wired or wireless communication protocols. The security system 10 may include video cameras 18, individually labeled as 18a and 18b. While two video cameras 18 are shown, it will be appreciated that this is merely illustrative, as the security system 10 may include any number of video cameras 18. In some instances, the video cameras 18 may be used to capture additional information regarding a possible event in an area or region in which one of the security system components 14 such as a non-video based security sensor is reporting a possible event.

In some instances, the security system 10 includes or is operably coupled with an edge gateway 20 that allows the security system 10 to communicate with remote devices such as but not limited to a cloud-based monitoring system, as an example, that enables monitoring the security system 10 from a remote location. In some instances, the security system 10 may alternatively or additionally include a local monitoring station 22 that allows an operator to locally monitor the security system 10 from within the facility 12.

Figure 1B:
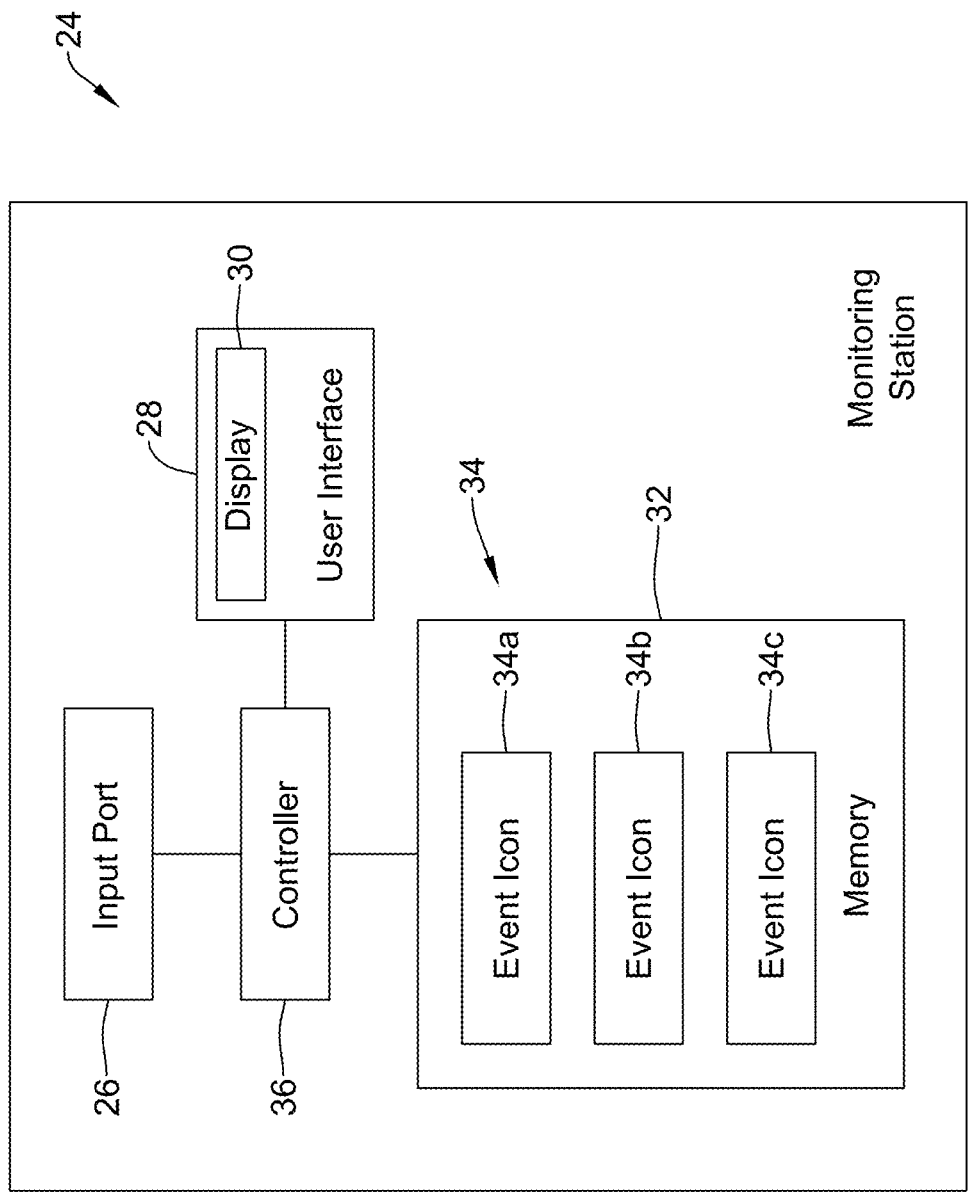
FIG. 1B is a schematic block diagram of an illustrative monitoring station.

FIG. 1B is a schematic block diagram of an illustrative monitoring station 24. The illustrative monitoring station 24 may be considered as being an example of the local monitoring station 22. In some cases, the monitoring station 24 may instead be considered as being a remote monitoring station (e.g. cloud-based monitoring system) that is operably coupled with the edge gateway 20 over the Internet, for example. The monitoring station 24 includes an input port 26 that is configured to receive events that are produced by each of plurality of security system components 14. Each of the security system components 14 may be considered as being located in a corresponding geographic region of the facility. As an example, a first security system component 14 may be located on a north wall of a room A of a building B, and a second security system component 14 may be located on the ceiling in a hallway C running on the south side of a Building D.

The illustrative monitoring station 24 includes a user interface 28 that includes a display 30. The user interface 28 may include additional components, such as but not limited to a keyboard, a mouse, a tracking ball, or other device that allows an operator to enter information. In some cases, the user interface 28 may include a touch screen that serves as the display 30 as well as a data entry device.

The illustrative monitoring station 24 includes a memory 32 that is configured to store a plurality of predefined event icons 34, individually labeled as 34*a*, 34*b* and 34*c*. While a total of three predefined event icons 34 are shown, it will be appreciated that the memory 32 may store any number of predefined event icons 34, and in some cases may store considerably more than three predefined event icons 34. Each of the plurality of predefined event icons 34 corresponds to a different one of a plurality of event types, and each of the plurality of predefined event icons 34 includes a graphical representation that is indicative of the corresponding event type. At least some of the predefined event icons may be a static icon that include a predefined static image that is indicative of the corresponding event type. At least one of the predefined event icons may be an animated event icon that include a predefined animation that is indicative of the corresponding event type. FIGS. 4A through 4C, 5A through 5C, 6A through 6C and 7A through 7C, to be discussed, provide examples of predefined event icons 34.

A controller 36 is operably coupled with the input port 26, the user interface 28 and the memory 32. The controller 36 is configured to receive via the input port 26 a plurality of events produced by one or more of the security system components 14, each of the plurality of events produced at a corresponding time. The controller 36 identifies for each of the plurality of events received via the input port 26 a corresponding event type from a plurality of event types. The controller 36 is configured to display on the display 30 of the user interface 28 a spatial representation of at least part of the facility 12. In some cases, the spatial representation of at least part of the facility 12 may include a floor plan of at least part of the facility 12. The spatial representation of at least part of the facility 12 may be a photograph of that part of the facility 12 that has been uploaded to the monitoring station 24. The spatial representation of at least part of the facility 12 may be part of a Building Information Model (BIM) of the facility.

For each of at least some of the plurality of events received via the input port 26, the controller 36 is configured to display on the spatial representation of at least part of the facility, the predefined event icon that corresponds to the event type of the event, at a location that corresponds to the geographic region of the facility that the component that detected the event is located, and at a time that corresponds to the time that the event was detected by the corresponding component. In some instances, the received events include one or more informational events, wherein the one or more informational events include one or more of an automatic arm event, a system reboot event and a macro triggered event. At least some of the events produced by the security system components 14 may be live events. At least some of the events produced by the security system components 14 may be recorded events.

In some instances, the controller 36 may be configured to receive a video captured by each of one or more of the video cameras 18. Each of the one or more video cameras 18 located in a corresponding geographic region of the facility 12 and having a field of view. For each of at least some of the plurality of events received via the input port 26, the controller 36 may be configured to determine whether one or more of the video cameras 18 has a field of view that includes at least part of the geographic region of the facility 12 that the security system component 14 that produced the event is located, and if so, display on the spatial representation of at least part of the facility 12 a video camera icon that displays a video clip captured by the video camera 18 that has a field of view that includes at least part of the geographic region of the facility 12 that the security system component 14 that produced the event is located, at a location that corresponds to the geographic region of the facility 12 that the security system component 14 that produced the event is located, and synced in time to the time that the event was produced by the corresponding security system component 14.

The controller 36 may be configured to accept a time range from a user via the user interface 28 and to assemble an animation clip that includes, for each of at least some of the plurality of events produced during the time range, the spatial representation of at least part of the facility 12 with the predefined event icon that corresponds to the event type of the event displayed at a location that corresponds to the geographic region of the facility that the security system component 14 that produced the event is located, and at a time that corresponds to the time that the event was produced by the corresponding security system component 14. In some instances, the controller 36 may be configured to accept one or more filter parameters from the user via the user interface 28 for filtering the event types that are to be included in the animation clip. Alternatively, or in addition, the controller 36 may be configured to accept one or more geographic parameters from the user via the user interface for filtering events that correspond to one or more selected geographic regions of the facility 12 for inclusion in the animation clip (see, for example, FIG. 8).

Figure 2:
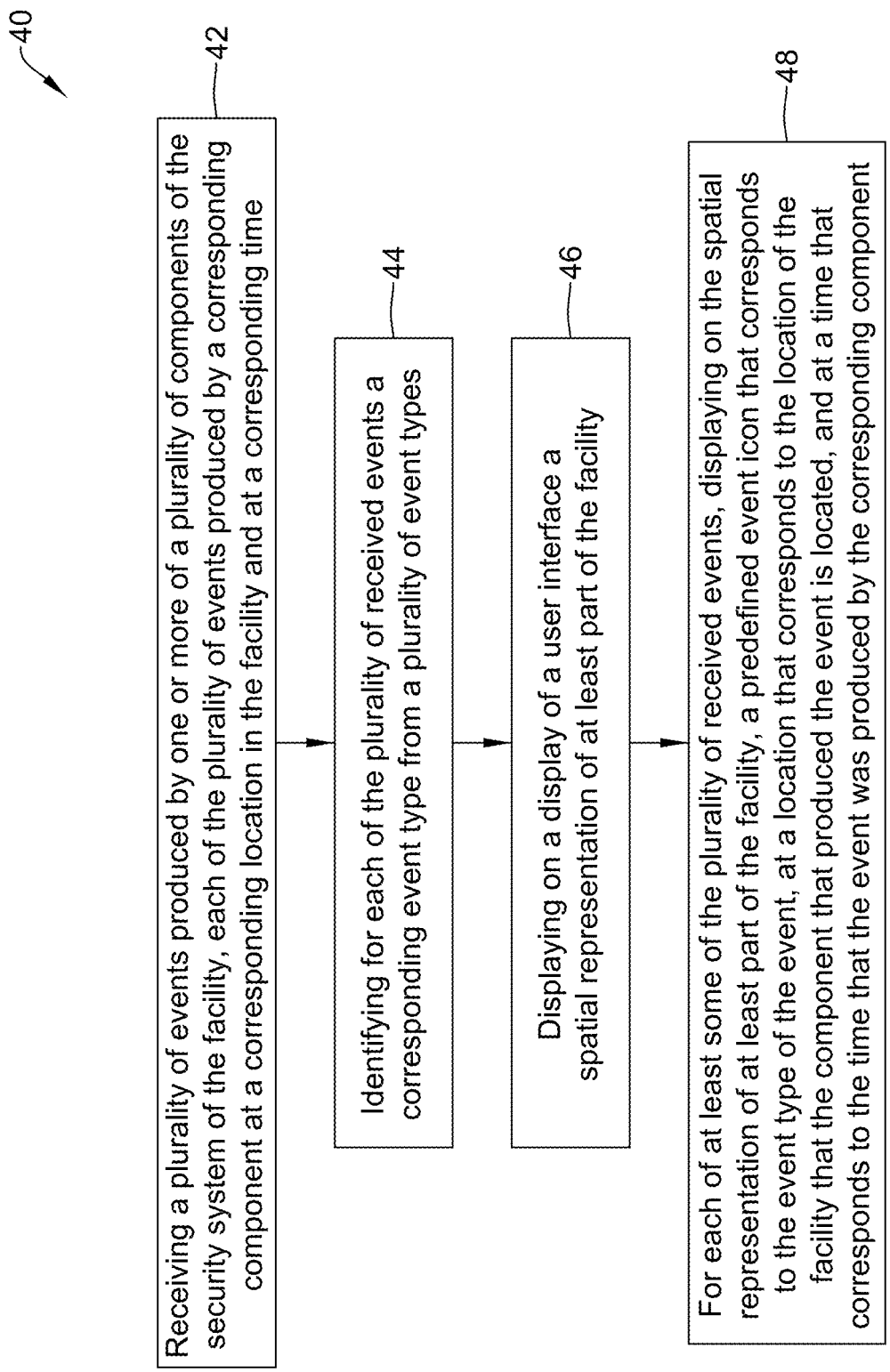
FIG. 2 is a flow diagram showing an illustrative method of monitoring a security system.

FIG. 2 is a flow diagram showing an illustrative method 40 for monitoring a security system (such as the security system 10) of a facility (such as the facility 12). The illustrative method 40 includes receiving a plurality of events produced by one or more of a plurality of components of the security system of the facility (such as the security system components 14), each of the plurality of events produced by a corresponding component at a corresponding location in the facility and at a corresponding time, as indicated at block 42. For each of the plurality of received events, a corresponding event type is identified from a plurality of event types, as indicated at block 44. A spatial representation of at least part of the facility is displayed on a display (such as the display 30) of a user interface (such as the user interface 28), as indicated at block 46. For each of at least some of the plurality of received events, a predefined event icon that corresponds to the event type of the event is displayed on the spatial representation of at least part of the facility, at a location that corresponds to the location of the facility that the component that produced the event is located, and at a time that corresponds to the time that the event was produced by the corresponding component, as indicated at block 48.

Figure 3:
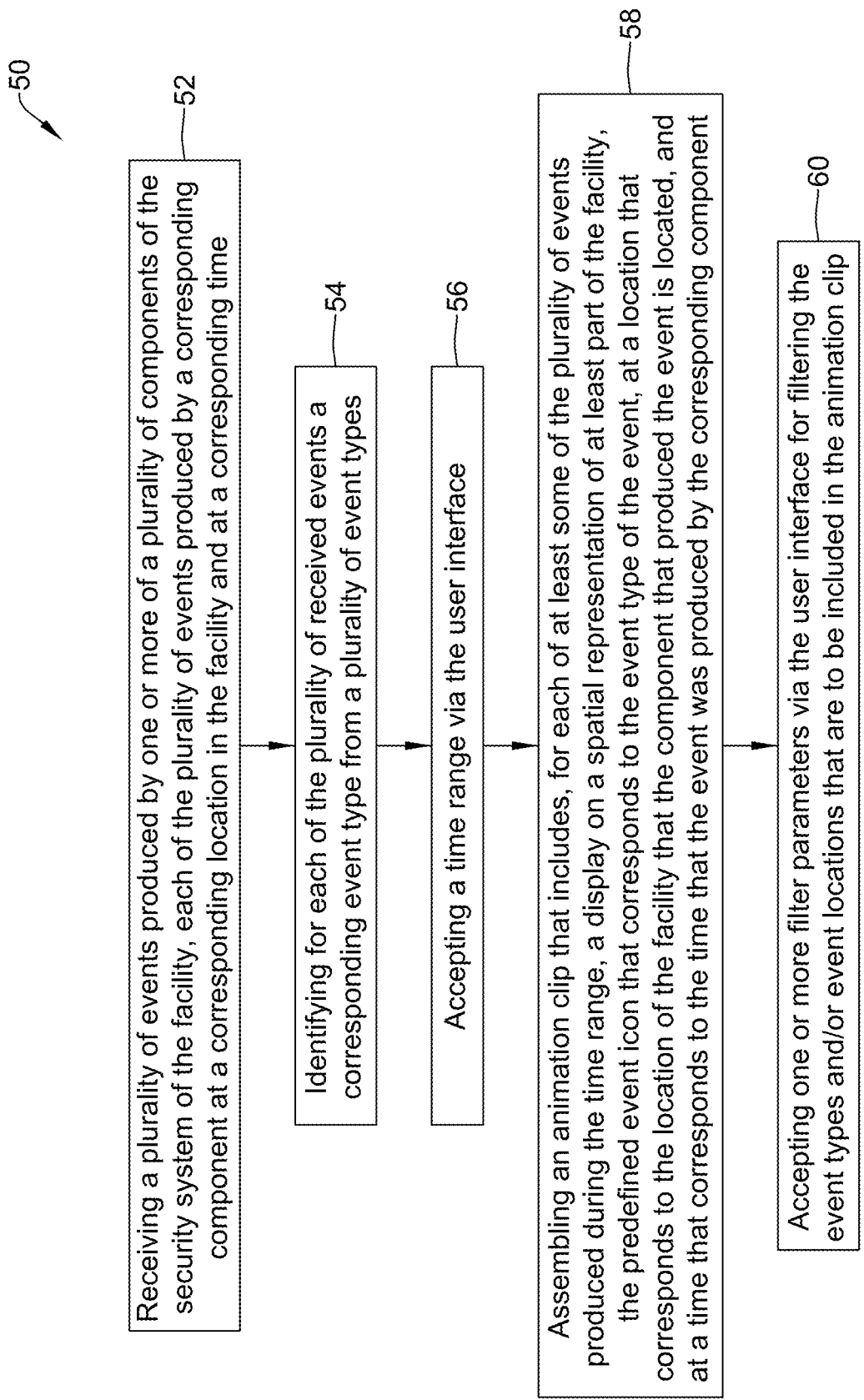
FIG. 3 is a flow diagram showing an illustrative method of monitoring a security system.

FIG. 3 is a flow diagram showing an illustrative method 50 for monitoring a security system (such as the security system 10) of a facility (such as the facility 12). The illustrative method 50 includes receiving a plurality of events produced by one or more of a plurality of components of the security system of the facility (such as the security system components 14), each of the plurality of events produced by a corresponding component at a corresponding location in the facility and at a corresponding time, as indicated at block 52. For each of the plurality of received events, a corresponding event type is identified from a plurality of event types, as indicated at block 54.

A time range is accepted via the user interface, as indicated at block 56. An animation clip is assembled that includes, for each of at least some of the plurality of events produced during the time range, the spatial representation of at least part of the facility with the predefined event icon that corresponds to the event type of the event displayed at a location that corresponds to the location of the facility that the component that produced the event is located, and at a time that corresponds to the time that the event was produced by the corresponding component, as indicated at block 58. In some cases, the method 50 may further include accepting one or more filter parameters via the user interface for filtering the event types and/or event locations that are to be included in the animation clip, as indicated at block 60.

Figure 4C:
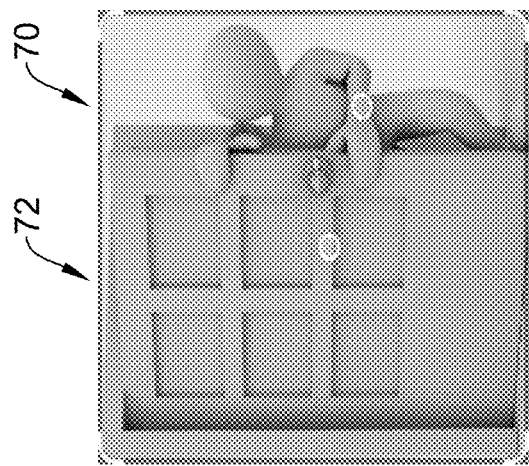
FIGS. 4A through 4C show illustrative examples of predefined event icons pertaining to sensor alarm events.
Figure 4B:
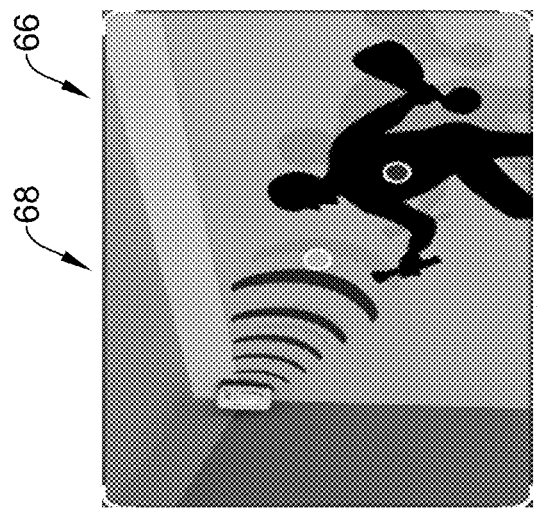
Figure 4A:
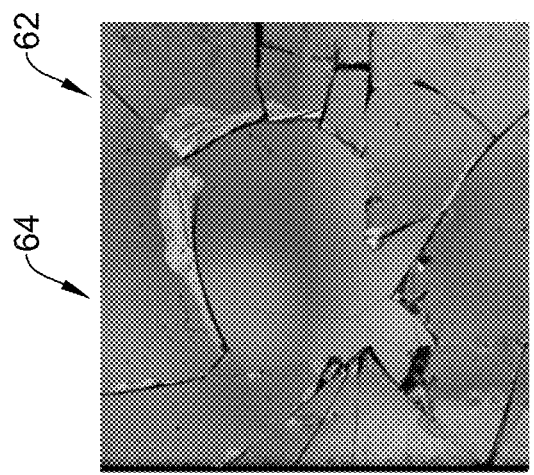

FIGS. 4A through 4C provide illustrative examples of predefined event icons pertaining to sensor alarm events. These are predefined event icons that may be displayed on a spatial representation of at least part of the facility 12 in order to indicate that an event was detected by one of the security system components 14. FIG. 4A shows a predefined event icon 62 that may be used to represent a glass break detection by a glass break sensor. The predefined event icon 62 includes a graphical representation 64 of broken glass in order to quickly and intuitively convey what the predefined event icon 62 is representing. FIG. 4B shows a predefined event icon 66 that may be used to indicate that a motion sensor such as a PIR sensor has detected motion in an area and at a time that should not have any motion. The predefined event icon 66 includes a graphical representation 68 showing a motion sensor detecting an intruder in order to quickly and intuitively convey what the predefined event icon 66 is representing. FIG. 4C shows a predefined event icon 70 that may be used to indicate that an entry has been detected by a door contact sensor at a time that perhaps no entry is expected or appropriate. The predefined event icon 70 includes a graphical representation 72 of a person opening a door in order to quickly and intuitively convey what the predefined event icon 70 is representing.

Figure 5C:
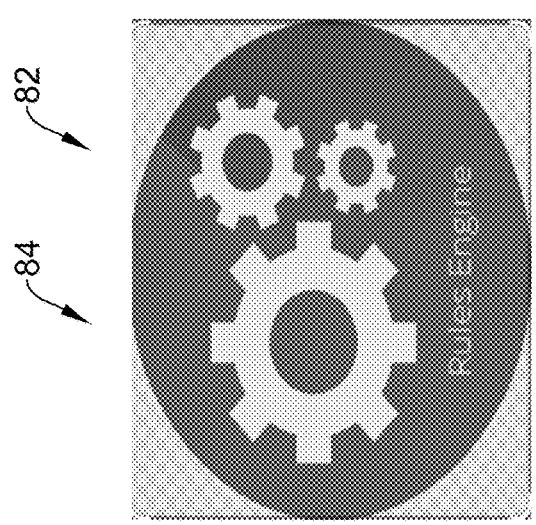
FIGS. 5A through 5C show illustrative examples of predefined event icons pertaining to informational events.
Figure 5B:
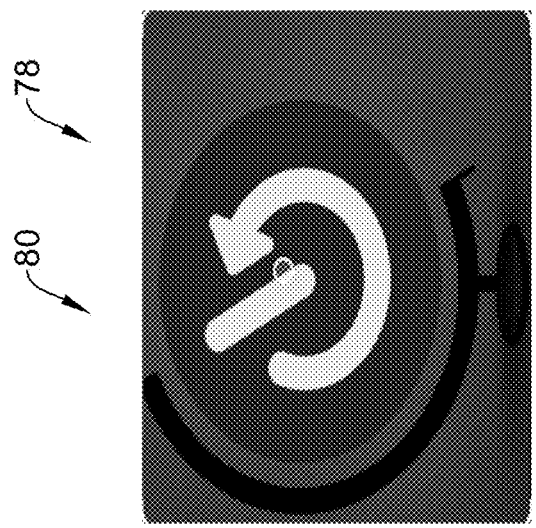
Figure 5A:
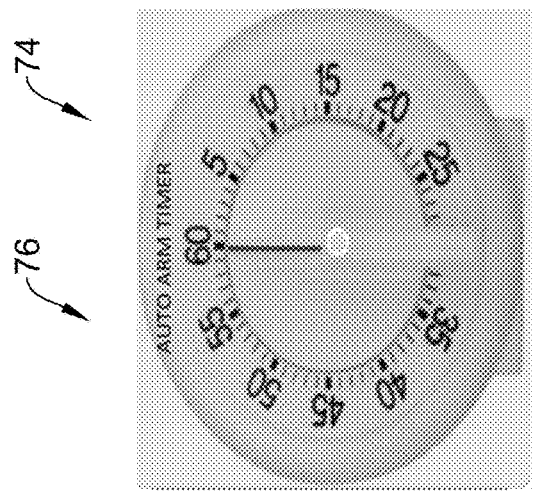

FIGS. 5A through 5C show illustrative examples of predefined event icons pertaining to informational events. These are predefined event icons that may be displayed on a spatial representation of at least part of the facility 12 in order to indicate an event that was detected by one of the security system components 14. FIG. 5A shows a predefined event icon 74 that may be used to represent an automatic arm event in which the security system has automatically armed itself (e.g. per a schedule). The predefined event icon 74 includes a graphical representation 76 of a timer in order to quickly and intuitively convey what the predefined event icon 74 is representing. FIG. 5B shows a predefined event icon 78 that may be used to indicate a system reboot by the security system. The predefined event icon 78 includes a graphical representation 80 showing a power button being cycled in order to quickly and intuitively convey what the predefined event icon 78 is representing. FIG. 5C shows a predefined event icon 82 that may be used to represent triggering of a macro event, such as by a rules engine built into the security system 10. The predefined event icon 82 includes a graphical representation 84 of gears in a rules engine in order to quickly and intuitively convey what the predefined event icon 82 is representing.

Figure 6C:
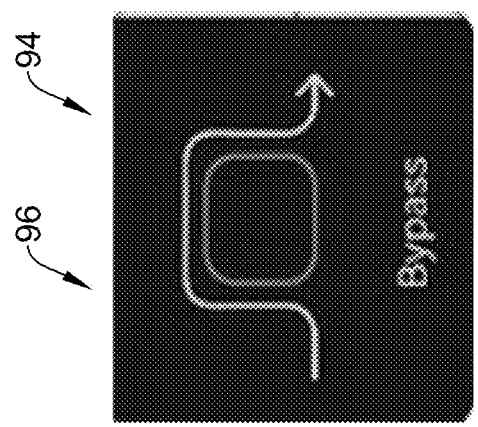
FIGS. 6A through 6C show illustrative examples of predefined event icons pertaining to user activity events.
Figure 6B:
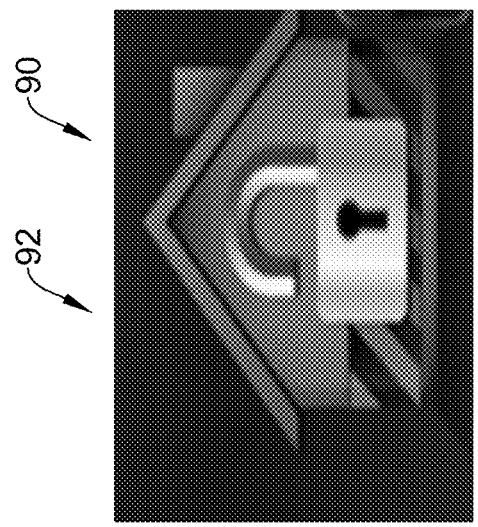
Figure 6A:
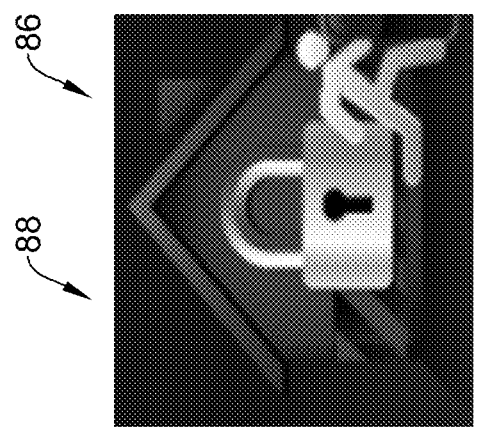

FIGS. 6A through 6C show illustrative examples of predefined event icons pertaining to user activity events. These are predefined event icons that may be displayed on a spatial representation of at least part of the facility 12 in order to indicate user activity pertaining to the security system 10. FIG. 6A shows a predefined event icon 86 that may be used to represent a user manual arming the security system. The predefined event icon 86 includes a graphical representation 88 of a locked lock in order to quickly and intuitively convey what the predefined event icon 86 is representing. FIG. 6B shows a predefined event icon 90 that may be used to indicate that the user has manually disarmed the security system. The predefined event icon 92 includes a graphical representation 80 showing an unlocked lock in order to quickly and intuitively convey what the predefined event icon 78 is representing. FIG. 6C shows a predefined event icon 94 that may be used to indicate that the user has bypassed a sensor of the security system. The predefined event icon 94 includes a graphical representation 96 of a bypassed sensor in order to quickly and intuitively convey what the predefined event icon 94 is representing.

Figure 7C:
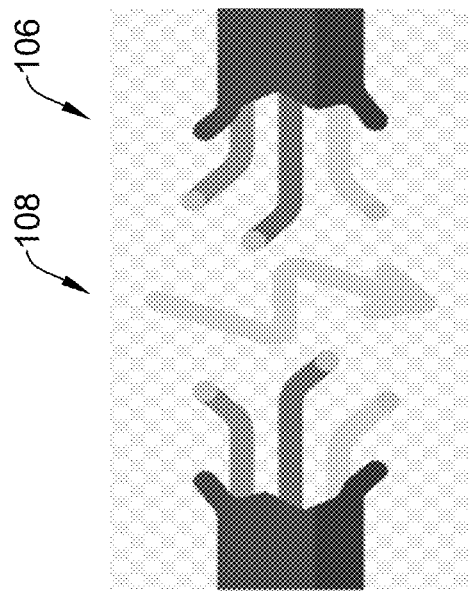
FIGS. 7A through 7C show illustrative examples of predefined event icons pertaining to sensor health events.
Figure 7B:
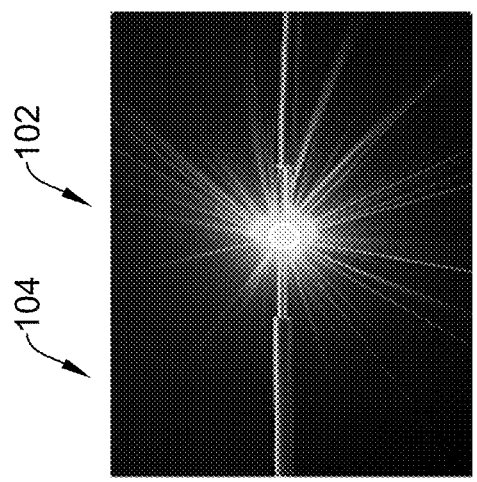
Figure 7A:
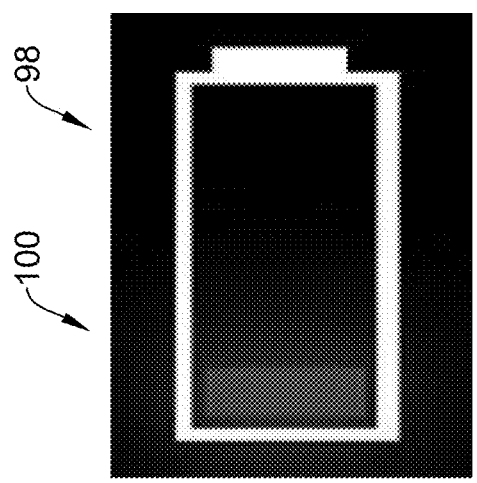

FIGS. 7A through 7C show illustrative examples of event icons pertaining to sensor health events. These are predefined event icons that may be displayed on a spatial representation of at least part of the facility 12 in order to indicate possible problems with particular elements of the security system 10. FIG. 7A shows a predefined event icon 98 that may be used to represent a sensor (or other component) with a low battery. The predefined event icon 98 includes a graphical representation 100 of a low power battery in order to quickly and intuitively convey what the predefined event icon 98 is representing. FIG. 7B shows a predefined event icon 102 that may be used to indicate that there is a short circuit within a sensor (or other) circuit. The predefined event icon 102 includes a graphical representation 104 showing two wires accidentally touching with a resulting spark in order to quickly and intuitively convey what the predefined event icon 102 is representing. FIG. 7C shows a predefined event icon 106 that may be used to indicate that there is an open circuit within a sensor (or other) circuit. The predefined event icon 106 includes a graphical representation 108 of a broken circuit in order to quickly and intuitively convey what the predefined event icon 106 is representing. The predefined icons shown in FIGS. 4A-7C are merely examples. Additional and/or different predefined icons may be used as desired.

Figure 8:
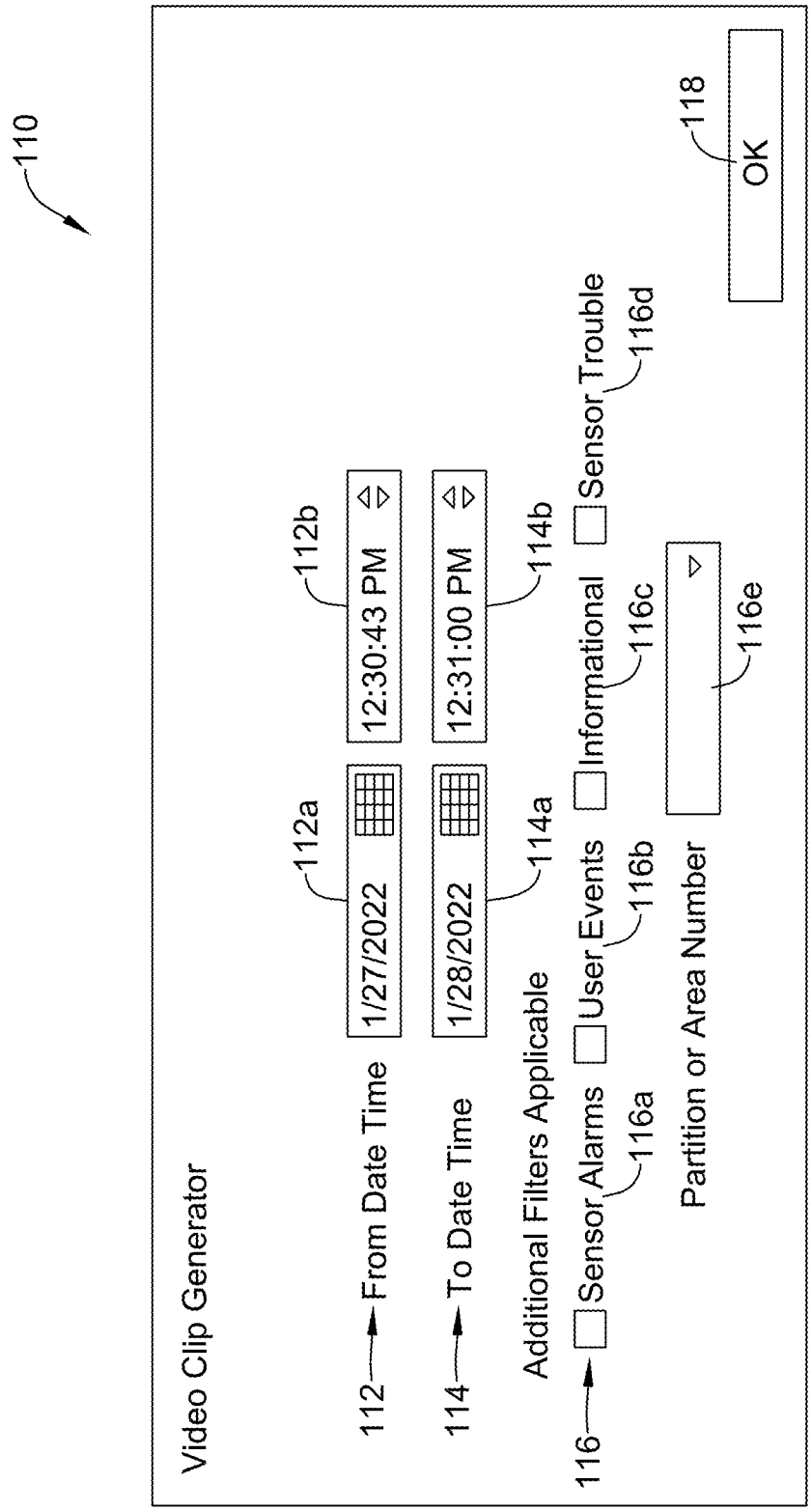
FIG. 8 is a screen shot showing an illustrative screen that may be displayed in accordance with generating an animated video clip.

FIG. 8 is a screen shot showing an illustrative screen 110 that may be displayed in accordance with generating an animated video clip. The screen 110 is configured to allow a user to select a time frame for viewing possible security system events as well as to optionally select one or more filters to limit the animated video clips to particular types of events and/or to particular areas in the facility, if desired. The illustrative screen 110 includes a starting time region 112 and an ending time region 114. The starting time region 112 includes a pull-down calendar 112a that allows the user to select the starting date and a clock 112b that allows the user to select the starting time. The ending time region 114 includes a pull-down calendar 114a that allows the user to select the ending date and a clock 114b that allows the user to select the ending time.

The illustrative screen 110 includes a filtering region 116 including one or more of a Sensor Alarms checkbox 116a that when checked, causes display of all security sensor alarms within the designated time frame, a User Events checkbox 116b that when checked, causes display of all user events within the designated time frame, an Informational checkbox 116c that when checked, causes display of information events within the designated time frame, and a Sensor Trouble checkbox 116d that, when checked, causes display of all sensor health events within the designated time frame. A Partition or Area Number pull-down 116e allows the user to narrow the particular region of the facility that they are interested in. An OK button 118 allows the user to tell the system to proceed with the selections made on the screen 110.

In preparing an animated video clip that shows the desired system events, it will be appreciated that significant lengths of time may go by without any system events. If a user selects a 12 hour time frame, there may only be a few events within that 12 hour time frame. In some instances, the animated video clip may include all 12 hours within the time frame, perhaps only showing frames that correspond to every 1 minute, every 5 minutes, every 10 minutes, or longer of the 12 hour time frame unless an event is present. In some cases, the animated video clips may exclude frames that do not include any new events. When so provided, the animated video clip may be substantially shorter in length than the actual time frame of 12 hours in this example.

Figure 9:
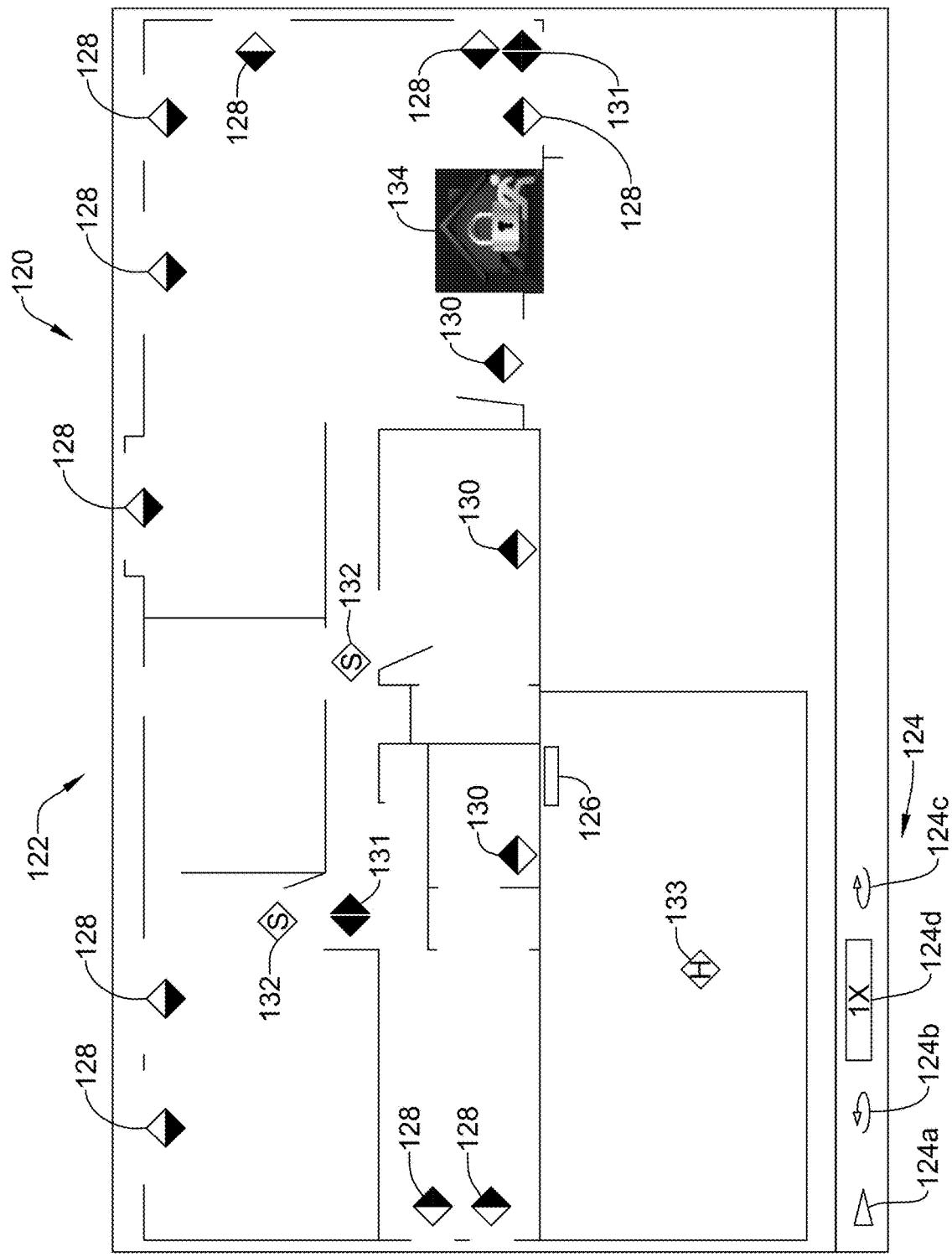
FIG. 9 is a screen shot showing an illustrative screen from an animated video clip with a system arming event displayed.
Figure 10:
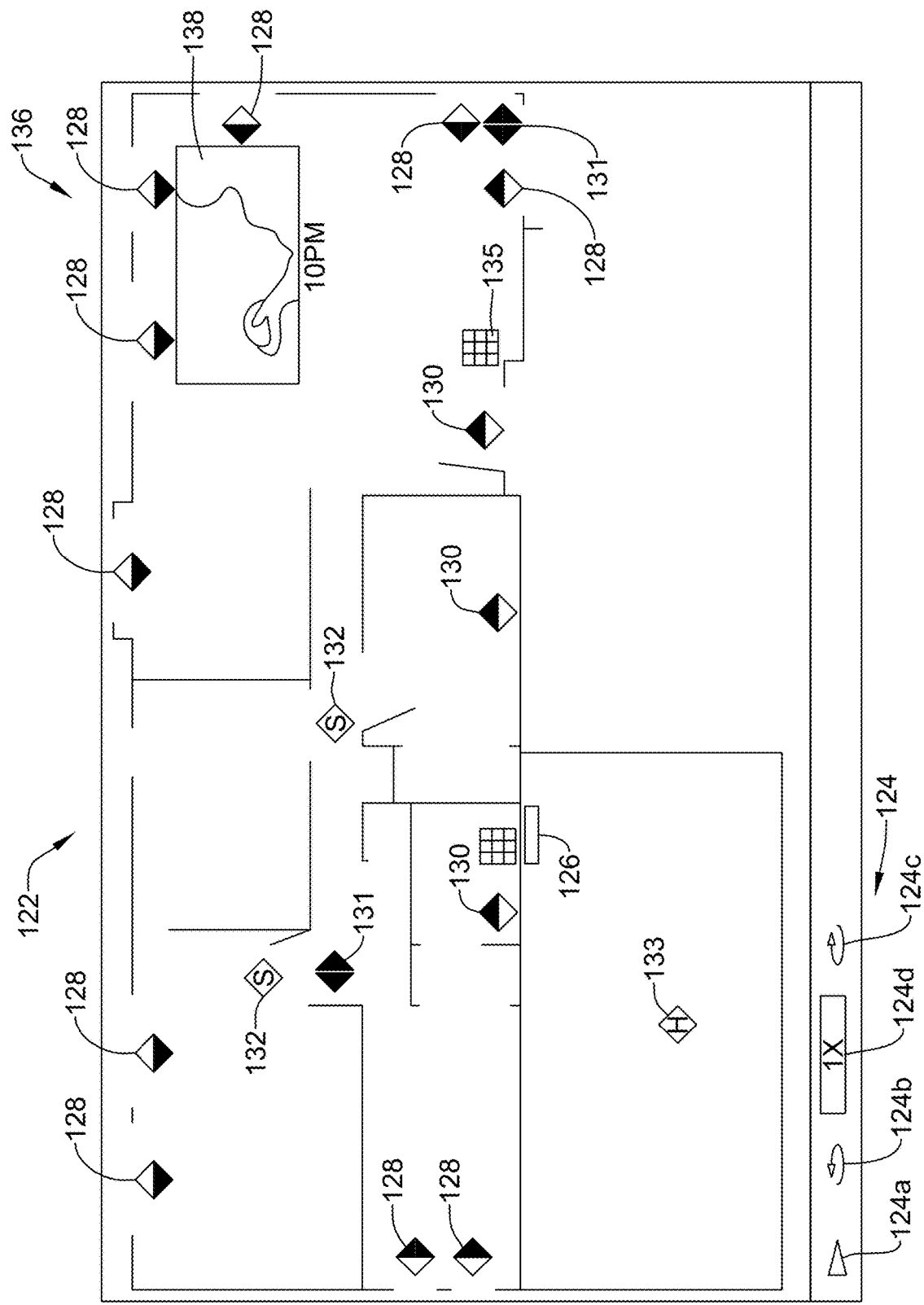
FIG. 10 is a screen shot showing an illustrative screen from an animated video clip with a glass break event displayed.

FIGS. 9 and 10 are screen shots from an example animated video clip that shows, among other events, a manual arming event that occurs at 7 pm (FIG. 9) and a glass break detection that occurs at 10 pm (FIG. 10). While these two events are three hours apart in real time, the animated video clip may be considerably shorter, particularly if screens showing no new events are excluded. In some cases, the time of the event is displayed along with the corresponding icon.

FIG. 9 is a screen shot showing an illustrative screen 120 from an animated video clip showing a manual arming event of the security system. The screen 120 includes a spatial representation 122 of part of the facility 12. In this example, the spatial representation 122 is part of a floor plan. The screen 120 includes video controls 124 including a play button 124a, a back button 124b, and a fast-forward button 124c. The video controls 124 also include a playback speed indicator 124d, which currently indicates a 1× playback speed. In some cases, the user may be able to select the playback speed indicator 124d in order to change the playback speed to a 2× or 3× or faster playback speed. In some cases, the user may use the fast-forward button 124c to change the playback speed, and the resulting playback speed may be reflected by the playback speed indicator 124d.

The spatial representation 122 includes icons indicating the relative position of a variety of different security system components within the space represented by the spatial representation 122. For example, there is a distribution panel 126. A number of window contact sensors 128 are included, as are a number of door contact sensors 130. Several glass break sensors 131 are included. Smoke detectors 132 are shown on the spatial representation, as is a heat detector 133. Other sensors may also be included, such as glass break detectors, microphones and video cameras to name a few. As shown, the screen shot 120 corresponds to 7 PM, which is a time of day in which the security system was manually armed at a security keypad, as indicated by predefined event icon 134. In comparing FIG. 9 with FIG. 10, it can be seen that the predefined event icon 134 is positioned where a security key pad is located, as indicated by a predefined event icon 135 shown in FIG. 10.

FIG. 10 is a screen shot showing an illustrative screen 136 from an animated video clip showing a glass break event. The screen 136 is similar to the screen 120, but has been advanced up to 10 PM, which is a time at which a glass break detector detected glass being broken in an area near where a window was broken, as indicated by a predefined event icon 138. As can be seen, such an approach provides security personnel at a monitoring station an intuitive sense of what is happening, where particular events are occurring and in what sequence.

While a security system is used herein as an example, it is contemplated that the present disclosure is applicable to any suitable system that detects events over time, and it is desirable to provide monitoring personnel with an intuitive sense of what is happening, where particular events are occurring and in what sequence. Examples systems include industrial manufacturing systems such as oil refineries or other manufacturing systems, energy generation systems such as power plants, energy distribution systems such as the power grid, building control systems such as Heating, Ventilation and/or Air Conditioning (HVAC) systems, transportation systems such as rail or airlines, vehicles, and/or any other suitable system.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A monitoring station for a security system of a facility, the monitoring station comprising:
   an input port for receiving events produced by each of a plurality of components of the security system of the facility, wherein each of the plurality of components is associated with a corresponding geographic region of the facility;
   a user interface including a display;
   a memory configured to store a plurality of predefined event icons, wherein each of the plurality of predefined event icons corresponds to a different one of a plurality of event types, and each of the plurality of predefined event icons includes a graphical representation that is indicative of the corresponding event type;
   a controller operably coupled with the input port, the user interface and the memory, the controller configured to:
      receive via the input port a plurality of events produced by one or more of the plurality of components of the security system of the facility, each of the plurality of events produced at a corresponding time;
      identify for each of the plurality of events received via the input port a corresponding event type from the plurality of event types;
      receive one or more event type filter parameters from a user via the user interface, the one or more event type filter parameters identifying one or more selected event types;
      filter the plurality of events received via the input port using the one or more event type filter parameters, resulting in one or more filtered events that each have an event type that is one of the one or more selected event types;
      display on the display of the user interface a spatial representation of at least part of the facility; and
      for each of the one or more filtered events, display on the spatial representation of the at least in part of the facility the predefined event icon that corresponds to the event type of the respective filtered event, at a location that corresponds to the geographic region of the facility that the component that produced the respective filtered event is located, and at a time that corresponds to the time that the respective filtered event was produced by the corresponding component.

2. The monitoring station of claim 1, wherein the spatial representation of at least part of the facility includes a floor plan of at least part of the facility.

3. The monitoring station of claim 1, wherein at least one of the predefined event icons is a static icon that include a predefined static image that is indicative of the corresponding event type.

4. The monitoring station of claim 1, wherein at least one of the predefined event icons is an animated icon that include a predefined animation that is indicative of the corresponding event type.

5. The monitoring station of claim 1, wherein the plurality of components of the security system comprise one or more sensors, wherein at least some of the one or more sensors produce an event when a corresponding sensed condition is detected.

6. The monitoring station of claim 5, wherein the one or more sensors include one or more of a glass break sensor, a motion sensor, a door contact sensor, and a window contact sensor.

7. The monitoring station of claim 1, wherein the plurality of components of the security system comprise one or more sensors, wherein at least some of the one or more sensors produce an event when a corresponding sensor condition is detected, wherein the sensor condition includes one or more of a sensor low battery condition, a sensor short circuit condition and a sensor open circuit condition.

8. The monitoring station of claim 1, wherein the plurality of components of the security system comprise one or more security panels, wherein one or more of the security panels produce an event when a user arms at least part of the security system via the one or more security panels, the user disarms at least part of the security system via the one or more security panels and/or the user bypasses a security sensor of the security system via the one or more security panels.

9. The monitoring station of claim 1, wherein the plurality of events comprise one or more informational events, wherein the one or more informational events include one or more of an automatic arm event, a system reboot event and a macro triggered event.

10. The monitoring station of claim 1, wherein the controller is configured to receive a video captured by each of one or more video cameras, each of the one or more video cameras located in a corresponding geographic region of the facility and having a field of view, wherein for each of at least some of the one or more filtered events, the controller configured to:
    determine whether one or more of the video cameras has a field of view that includes at least part of the geographic region of the facility that the component that produced the respective filtered event is located, and if so, display on the spatial representation of at least part of the facility a video camera icon that displays the video captured by a video camera that has a field of view that includes at least part of the geographic region of the facility that the component that produced the respective filtered event is located, at a location that corresponds to the geographic region of the facility that the component that produced the respective filtered event is located, and synced to the time that corresponds to the time that the respective filtered event was produced by the corresponding component.

11. The monitoring station of claim 1, wherein the controller is configured to:
    accept a time range from the user via the user interface; and
    assemble an animation clip that includes, for each of at least some of the one or more filtered events produced during the time range, the display on the spatial representation of at least part of the facility, the predefined event icon that corresponds to the event type of the respective filtered event, at a location that corresponds to the geographic region of the facility that the component that produced the respective filtered event is located, and at a time that corresponds to the time that the respective filtered event was produced by the corresponding component.

12. The monitoring station of claim 11, wherein the one or more selected event types comprises one or more of a sensor alarm event type, an informational event type, a sensor condition event type.

13. The monitoring station of claim 11, wherein the controller is configured to:
    receive one or more geographic filter parameters via the user interface that identifies one or more selected geographic regions of the facility; and
    filter the plurality of filtered events using the one or more geographic filter parameters, resulting in one or more filtered events that each have an event type that is one of the one or more selected event types and are produced by a component that is located in the one or more selected geographic regions of the facility.

14. The monitoring station of claim 1, wherein the events produced by each of the plurality of components of the security system of the facility are live events.

15. The monitoring station of claim 1, wherein the events produced by each of the plurality of components of the security system of the facility are recorded events.

16. A method for monitoring a security system of a facility, the method comprising:
    receiving a plurality of events produced by one or more of a plurality of components of the security system of the facility, each of the plurality of events produced by a corresponding component at a corresponding location in the facility and at a corresponding time;
    identifying for each of the plurality of received events a corresponding event type from a plurality of event types;
    displaying on a display of a user interface a spatial representation of at least part of the facility; and
    for each of at least some of the plurality of received events, displaying on the spatial representation of at least part of the facility, a predefined event icon that corresponds to the event type of the respective event, at a location that corresponds to the location of the facility that the component that produced the respective event is located, wherein at least one of the predefined event icons is an animated icon that include a predefined animation within the predefined event icon that is indicative of the corresponding event type.

17. The method of claim 16, comprising:
accepting a time range via the user interface; and
assembling an animation clip that includes, for each of at least some of the plurality of events produced during the time range, the display on the spatial representation of at least part of the facility, the predefined event icon that corresponds to the event type of the event, at a location that corresponds to the location of the facility that the component that produced the event is located, and at a time in the animation clip that corresponds to a time that the event was produced by the corresponding component.

18. The method of claim 16, further comprising:
accepting one or more filter parameters via the user interface for filtering the plurality of events to identify only those events that have one or more designated event types and/or are produced by a corresponding component that is located in a one or more designated regions of the facility, resulting in one or more filtered events; and
for each of the one or more filtered events, but not for the events that are not one of the filtered events, displaying on the spatial representation of at least part of the facility, the predefined event icon that corresponds to the event type of the respective filtered event, at a location that corresponds to the location of the facility that the component that produced the respective filtered event is located.

19. A non-transient computer-readable storage medium having stored thereon instructions that when executed by one or more processors, cause the one or more processors to:
receive a plurality of events produced by one or more of a plurality of components of a building control system of a facility, each of the plurality of events produced by a corresponding component at a corresponding location in the facility and at a corresponding time;
identify for each of the plurality of received events a corresponding event type from a plurality of event types;
receive one or more event type filter parameters, wherein the one or more event type filter parameters identifying one or more selected event types;
filter the plurality of events using the one or more event type filter parameters, resulting in one or more filtered events that each have an event type that is one of the one or more selected event types;
display on a display of a user interface a spatial representation of at least part of the facility; and
for each of the one or more filtered events, display on the spatial representation of at least part of the facility, a predefined event icon that corresponds to the event type of the respective filtered event, at a location that corresponds to the location of the facility that the component that produced the respective filter event is located.

20. The non-transient computer-readable storage medium of claim 19, wherein the instructions cause the one or more processors to:
accept a time range via the user interface; and
assembly an animation clip that includes, for each of at least some of the one or more filtered events produced during the time range, the display on the spatial representation of at least part of the facility, the predefined event icon that corresponds to the event type of the respective filtered event, at a location that corresponds to the location of the facility that the component that produced the respective filtered event is located, and at a time in the animation clip that corresponds to the time that the respective filtered event was produced by the corresponding component.

* * * * *